United States Patent
Lin et al.

(10) Patent No.: US 9,047,193 B2
(45) Date of Patent: Jun. 2, 2015

(54) PROCESSOR-CACHE SYSTEM AND METHOD

(75) Inventors: Kenneth Chenghao Lin, Shanghai (CN); Haoqi Ren, Shanghai (CN)

(73) Assignee: SHANGHAI XIN HAO MICRO ELECTRONICS CO. LTD., Shanghai (CN)

( * ) Notice: Subject to any disclaimer, the term of this patent is extended or adjusted under 35 U.S.C. 154(b) by 241 days.

(21) Appl. No.: 13/520,572

(22) PCT Filed: Jan. 28, 2011

(86) PCT No.: PCT/CN2011/070776
§ 371 (c)(1),
(2), (4) Date: Jul. 4, 2012

(87) PCT Pub. No.: WO2011/091768
PCT Pub. Date: Apr. 8, 2011

(65) Prior Publication Data
US 2013/0111137 A1    May 2, 2013

(30) Foreign Application Priority Data

Jan. 29, 2010   (CN) .......................... 2010 1 0104030

(51) Int. Cl.
*G06F 9/34* (2006.01)
*G06F 12/08* (2006.01)
*G06F 9/30* (2006.01)

(52) U.S. Cl.
CPC ........ *G06F 12/0802* (2013.01); *G06F 9/30043* (2013.01); *G06F 9/30098* (2013.01); *G06F 9/34* (2013.01); *Y02B 60/1225* (2013.01)

(58) Field of Classification Search
CPC . G06F 17/30867; G06F 9/383; G06F 9/3842; G06F 12/0897; G06F 9/30043; G06F 9/3016; G06F 9/3824; G06F 9/3836; G06F 9/3004; G06F 9/30098; G06F 9/3834; G06F 9/3826; G06F 9/34
See application file for complete search history.

(56) References Cited

U.S. PATENT DOCUMENTS

| | | | | |
|---|---|---|---|---|
| 6,009,516 | A * | 12/1999 | Steiss et al. | 712/244 |
| 6,134,649 | A * | 10/2000 | Witt | 712/204 |
| 6,161,167 | A * | 12/2000 | Witt | 711/136 |
| 6,438,650 | B1 * | 8/2002 | Quach et al. | 711/118 |
| 6,449,693 | B1 * | 9/2002 | Goetz et al. | 711/122 |
| 6,728,867 | B1 * | 4/2004 | Kling | 712/216 |
| 2003/0163643 | A1 * | 8/2003 | Riedlinger et al. | 711/131 |

* cited by examiner

*Primary Examiner* — Matthew Bradley
*Assistant Examiner* — Candice Rankin
(74) *Attorney, Agent, or Firm* — Anova Law Group, PLLC

(57) ABSTRACT

A digital system is provided. The digital system includes an execution unit, a level-zero (L0) memory, and an address generation unit. The execution unit is coupled to a data memory containing data to be used in operations of the execution unit. The L0 memory is coupled between the execution unit and the data memory and configured to receive a part of the data in the data memory. The address generation unit is configured to generate address information for addressing the L0 memory. Further, the L0 memory provides at least two operands of a single instruction from the part of the data to the execution unit directly, without loading the at least two operands into one or more registers, using the address information from the address generation unit.

13 Claims, 8 Drawing Sheets

PROCESSOR-CACHE SYSTEM AND METHOD

TECHNICAL FIELD

The present invention generally relates to computer architecture and, more particularly, to the methods and systems for processor-cache processing.

BACKGROUND ART

In existing processor architectures, operands usually are loaded into registers from memory using a special 'load' instruction, and then sent to the execution unit for corresponding operations. After the execution is finished, the execution result is first stored in a register, and then written into memory from the register using a special 'store' instruction. Even for a processor able to obtain operands with direct memory addressing, due to the limitations on the number of memory ports and bandwidth, its execution unit cannot obtain all operands directly from the memory, but has to load certain operands from memory to registers. Thus, both memory and registers are used to provide all operands to the execution unit.

On the other hand, a cache is often provided to duplicate a part of contents of the memory (or operands) in the cache, so the contents can be quickly accessed by a processor in a short time in order to ensure continuous operations of a processor pipeline. However, even if the operands are in the cache as a mirrored part of the memory, some or all of the operands must still be loaded into the registers in order for the execution unit to use the operands.

DISCLOSURE OF INVENTION

Technical Problem

In software programs for conventional processors, 'load' instructions and 'store' instructions may be accounted for around thirty percent of all instructions executed. Because the 'load' instruction and the 'store' instruction do not involve any arithmetic or logical operations, the greater the proportion of these instructions in the software programs, the lower the utilization rate of the execution unit of the processor.

Certain technologies use a dedicated load/store unit to achieve some parallelism between execution of the load/store instructions and execution of arithmetic or logic instructions, and thus may improve the utilization rate of the execution unit of the processor. However, the close relationship between operands in the load/store instructions and the operands in the arithmetic or logic instructions makes the performance of such dedicated load/store unit less satisfactory. In addition, the additional load/store unit also increases the complexity of the processor.

Technical Solution

The disclosed methods and systems are directed to solve one or more problems set forth above and other problems.

One aspect of the present disclosure includes a digital system. The digital system includes an execution unit, a level-zero (L0) memory, and an address generation unit. The execution unit is coupled to a data memory containing data to be used in operations of the execution unit. The L0 memory is coupled between the execution unit and the data memory and configured to receive a part of the data in the data memory. The address generation unit is configured to generate address information for addressing the L0 memory. Further, the L0 memory provides at least two operands of a single instruction from the part of the data to the execution unit directly, without loading the at least two operands into one or more registers, using the address information from the address generation unit.

Another aspect of the present disclosure includes a method for performing a pipelined operation for a processor. The processor includes an execution unit coupled with a level-zero (L0) memory which contains a first memory and a second memory. The method includes providing an instruction read pipeline stage to read an instruction from an instruction memory and providing an instruction decoding pipeline stage to decode the instruction from the instruction memory and to obtain address information of one or more operands. The method also includes providing a data read pipeline stage to obtain the one or more operands from the L0 memory directly, without loading the one or more operands into one or more registers, using the obtained address information. Further, the method includes providing an execution pipeline stage to execute the instruction using the one or more operands and to generate an execution result and providing a data write-back pipeline stage to store the execution result into the L0 memory directly, without storing the execution result in a register.

Other aspects of the present disclosure can be understood by those skilled in the art in light of the description, the claims, and the drawings of the present disclosure.

Advantageous Effects

The disclosed processor-cache structure fetches operands directly and transparently from and writes back results directly and transparently to memory in supporting operations of execution units. The disclosed processor-cache structure does not employ a register file which requires explicit 'load' instructions to load operands from memory to the register file, and explicit 'store' instructions to store results from the register file to the memory as the current processor architecture requires. These load/store instructions constitute of approximately 30% of total instruction count in software programs running on the current processor architecture according to statistic. With the disclosed processor-cache structure, program instruction count can be significantly reduced due to the fact that the explicit load/store instructions to move data between register file and memory are not required in the disclosed structure. The disclosed processor-cache system also has an efficient and uniform pipeline structure which supports uniform instruction formats. Thus the program code density, program execution latency, program execution efficiency, and system power consumption can all be vastly improved.

BEST MODE

Figure 2A:
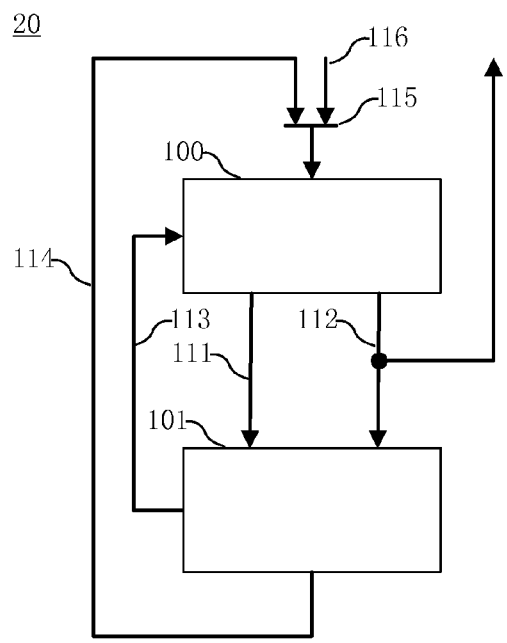
FIG. 2A illustrates another exemplary processor-cache structure consistent with the disclosed embodiments.
Figure 2B:
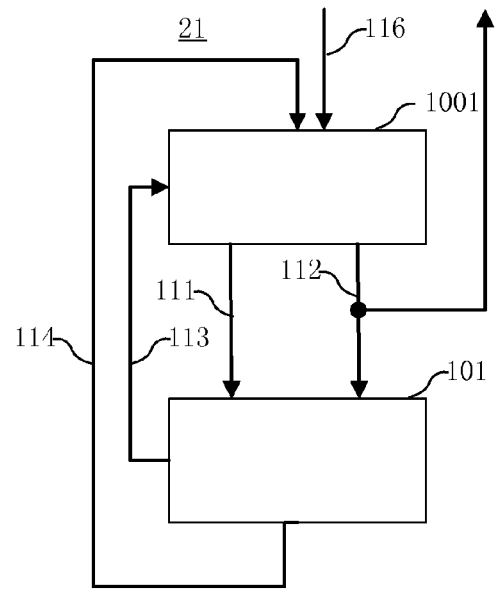
FIG. 2B illustrates another exemplary processor-cache structure consistent with the disclosed embodiments.
Figure 2C:
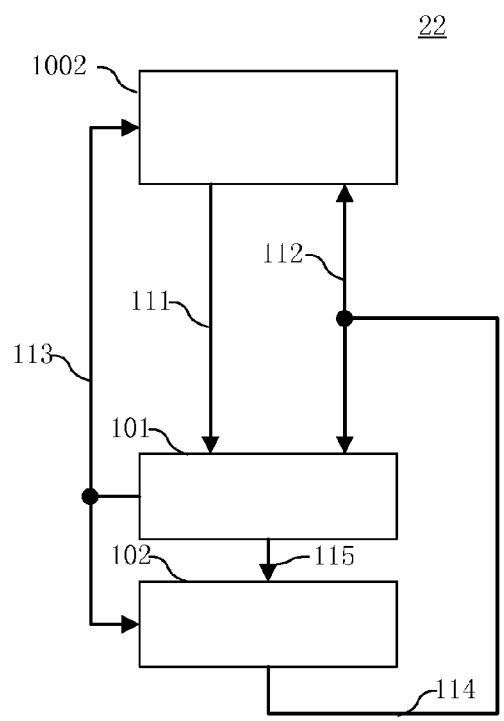
FIG. 2C illustrates another exemplary processor-cache structure consistent with the disclosed embodiments.

FIG. 2C illustrates an exemplary preferred embodiment(s).

Mode for Invention

Reference will now be made in detail to exemplary embodiments of the invention, which are illustrated in the accompanying drawings. The same reference numbers may be used throughout the drawings to refer to the same or like parts.

Figure 1:
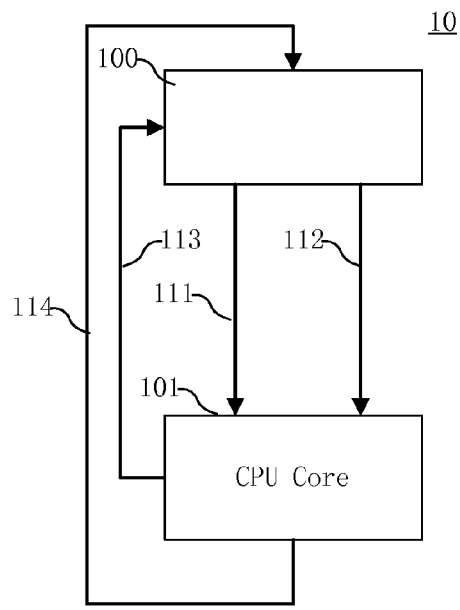
FIG. 1 illustrates an exemplary processor-cache structure consistent with the disclosed embodiments.

FIG. 1 illustrates an exemplary processor-cache structure 10 consistent with the disclosed embodiments. As shown in FIG. 1, processor-cache structure 10 includes a processor core 101 and a level-zero (L0) memory 100. Processor core 101 may include any appropriate processors or central processing unit (CPU) core, and the processor core 101 is coupled to the L0 memory 100 to obtain operands for operations. A level-zero or L0 memory, as used herein, refers to a memory coupled between the processor core 101 and a level-one memory or L1 cache, which is assumed as the lowest level in the memory hierarchy associated with the processor core 101. That is, the L1 cache is the closest memory to the processor core 101 in a conventional processor-cache structure, while the L0 memory is lower than (closer to the CPU core) than the L1 cache and is coupled between the CPU core 101 and the lowest-level cache. The L0 memory 100 may contain a mirrored image of part of contents of the L1 cache and may be accessed as a memory.

Thus, the L0 memory 100 is not provided as a register file, which needs special instructions such a 'load' instruction and a 'store' instruction to access. Instead, the L0 memory 100 may support various memory addressing mechanisms, such as direct addressing, indirect addressing, base plus offset addressing, immediate addressing, and implicit addressing, etc., and thus does not require the special instructions such the 'load' and 'store' instructions. Any appropriate memory addressing mechanisms may be used. For the illustrative purposes, assuming L1 cache does not miss while being accessed (no cache miss), and other mechanisms such as filling and replacement between L1 cache and L0 memory are also provided for facilitating the operation of L1 cache and L0 memory but are omitted in the descriptions.

Further, processor core 101 does not include a register file for data operations. That is, processor core 101 does not support special register instructions such as a 'load' instruction and a 'store' instruction to load operands from memory into registers. Of course, processor core 101 may include certain registers for certain operations, such as status registers and base point registers, etc. Thus, without the special instructions such as 'load' and 'store' instructions, processor core 101 provides address 113 for addressing L0 memory 100 and obtains operands 111 and 112 directly from L0 memory 100. After executing operations involving operands 111 and 112, processor core 101 writes back the result 114 to L0 memory 100. Processor core 101 also generates addresses for accessing L0 memory 100.

That is, processor core 101 does not include a register file, does not include the special 'load' instruction to load operands from memory to the register file, and does not include the special 'store' instruction to store results from the register file to the memory. Further, when addressing the L0 memory 100, processor core 101 may use, for example, an immediate direct addressing mode and a base address plus offset addressing mode.

In addition, L0 memory 100 may support two read operations for the two operands 111 and 112, and one write operation for storing result 114. Thus, L0 memory 100 may be a three-port memory to support these read and write operations simultaneously. Further, the operating frequency of the L0 memory 100 may correspond to the operating frequency of processor core 101 such that the L0 memory 100 may provide operands 111 and 112 to the execution unit of the processor core 101 and may also receive the result 114 from the execution unit of the processor core 101 at its maximum clock frequency without stall.

For example, if the processor core 101 supports an instruction set with a maximum of three data addressing, and the L0 memory 100 supports two read operations and one write operation in a single clock cycle, the delay in L0 memory 100 is less than or equal to that of the processor core 101. The processor core 101 may thus execute without any delays with respect to data operations.

FIG. 2A illustrates another exemplary processor-cache structure 20 consistent with the disclosed embodiments. Processor-cache structure 20 is similar to processor-cache structure 10 in FIG. 1. However, as shown in FIG. 2A, processor-cache structure 20 includes a refill path 116, which may be selected by multiplexer 117 to refill L0 memory 100 from external memory modules such as the L1 cache. Multiplexer 117 determines whether to input results from the processor core 101 or to input data from refill path 116 to L0 memory 100.

FIG. 2B illustrates another exemplary processor-cache structure 21 consistent with the disclosed embodiments. Processor-cache structure 21 is similar to processor-cache structure 20 in FIG. 2A. However, as shown in FIG. 2B, processor-cache structure 21 includes a separate port for refill path 116 on L0 memory 1001, instead of sharing a single port for both refill path 116 and results 114. For simplicity, although the refill path 116 is generally included either as a shared port or as an independent port, the refill path 116 may be omitted from time to time for simplicity purposes.

However, because the above described processor-cache structures require the L0 memory to be a 3-port memory, and large-scale 3-port memory is generally expensive. FIG. 2C illustrates another exemplary processor-cache structure 22 consistent with the disclosed embodiments. As shown in FIG. 2C, processor-cache structure 22 includes a first memory 1002 and a second memory 102 as the L0 memory. Processor core 101 is coupled to both first memory 1002 and second memory 102, and provides address 113 for addressing both first memory 1002 and second memory 102. Further, both first memory 1002 and second memory 102 provide operands to processor core 101.

More particularly, first memory 1002 may provide operand 111 to processor core 101 and second memory 102 may provide operand 112 to processor core 101. After execution, processor core 101 outputs result 115 to the second memory 102. Further, second memory 102 can also provide stored result 114 from a previous execution to the processor core 101 and/or first memory 1002. Thus, operand 112 provided by second memory 102 may often be results of a previous execution. Other configurations may also be used.

Figure 3:
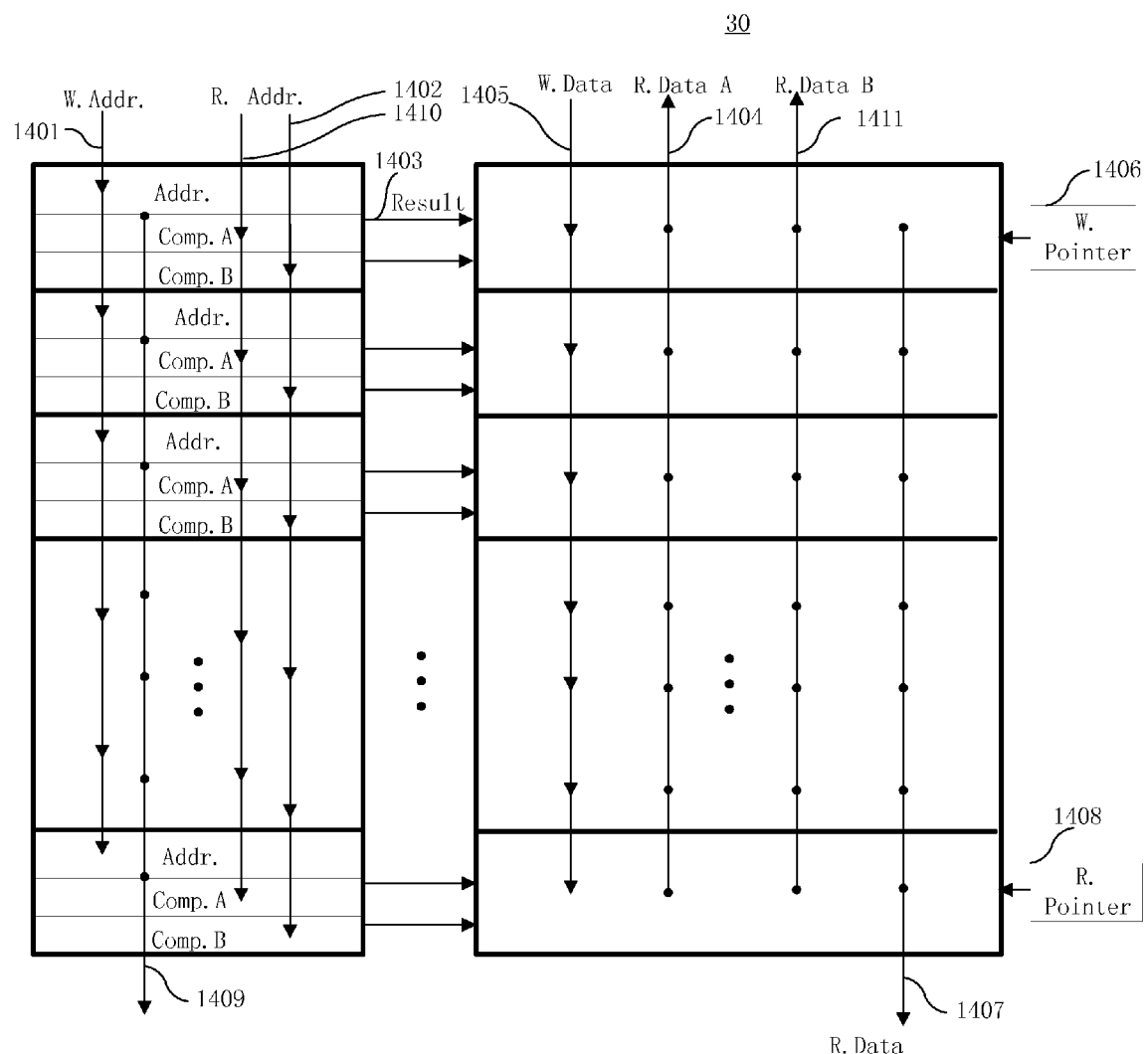
FIG. 3 illustrates an exemplary second memory consistent with the disclosed embodiments.

That is, the L0 memory includes the first memory 1002, which may be a 2-port memory (i.e., one read port and one write port), or a 1-port memory (i.e., one read/write port), and the second memory 102, which may be a 2-port memory (i.e., one write port and one read port). Thus, by arranging a separate first memory 1002 and a separate second memory 102, the number of ports required for the L0 memory may be reduced. Further, the first memory 1002 may include any appropriate type of memory, such as a regular cache with tag matching. The second memory 102 may be configured to perform various operations to manage relationships between operands and results. FIG. 3 illustrates an exemplary second memory 30 consistent with the disclosed embodiments.

As shown in FIG. 3, second memory 30 includes a content addressable memory (CAM) part (left) and a RAM part (right) for storage. The address of a data item to be stored in the RAM part is written into an entry in the CAM part via the write address (W. Addr.) bus 1401, and the data item is also written into a corresponding entry in the RAM part via the write data (W. Data) bus 1405.

For an operand-read operation, two read addresses of two operands may be inputted on the read address (R. Addr.) buses 1410 and 1402, and the two read addresses entered are compared with all entries of the CAM part during a CAM operation. The result 1403 of the comparison controls the RAM storage to read out corresponding stored data on data bus 1404 (R. Data A) and data bus 1411 (R. Data B). Although two operands are discussed, single operand or more than two operands may also be supported by the second memory 30.

Further, a write pointer 1406 points to a current entry for write operations in a first-in-first-out (FIFO) structure to support consecutive write operations of multiple data items. A read pointer 1408 also points to a current entry for read operations in a FIFO structure to support consecutive read operations of multiple data items. Data items can be read out via read data (R. Data) bus 1407, while the corresponding address of the read out data item is outputted on bus 1409. In addition, certain read/write mechanisms may be used to ensure that any data item read out has a most up-to-date value.

During operation, the second memory 30 may store operands and corresponding address information of the operands. The address information may include actual address value, a base address value and an offset value; or a base pointer register number and an offset value. Other types of address information may also be used. The read pointer 1408 and write pointer 1406 may be used to read out or write in operands according to predetermined algorithm(s). Further, through matching inputted address information of one or more operands, any matched operands can be outputted to processor core 101 for execution. The address information inputted may also include, for example, actual address value, a base address value and an offset value; or a base pointer register number and an offset value.

Further, second memory 30 may also support the write-merge function, i.e., by comparing the W Addr 1401 with each address content stored in each of the CAM entries, if the address of a data item to be written into second memory 30 already exists in a CAM entry, the data item is used to replace part or all of the existing data corresponding to the address of the data item in the second memory 30.

Thus, second memory 30 includes an operand storage unit (RAM part) and an address information storage unit (the CAM part). When performing a series of write operations to write operands in second memory 30, second memory 30 writes an operand into a storage entry pointed by the write pointer 1406 in the operand storage unit, and writes corresponding address information into a storage entry pointed by the write pointer 1406 in the address information storage unit. Further, the write pointer is increased by one and move to the next entry like a circular buffer. The write operations may be used to store results to second memory 30 from processor core 101.

When performing a series of read operations to read operands from second memory 30, second memory 30 reads an operand from a storage entry pointed by the read pointer 1408 in the operand storage unit, and reads corresponding address information from a storage entry pointed by the read pointer 1408 in the address information storage unit. Further, the read pointer 1408 is increased by one and move to the next entry like a circular buffer. The read operations may be used to move data in second memory 30 to the first memory.

Under certain circumstances, when the write pointer 1406 or read pointer 1408 reaches a last entry in the operand storage unit, the write pointer 1406 or read pointer 1408 may point to a first entry in the operand pointer storage unit. Thus, second memory 30 may act like a circular FIFO queue, supporting certain features such as circular first-in-first-out queue write, read, and data validation, queue full, and queue empty, etc.

As explained, second memory 30 also provides operands to the processor core 101. When providing operands, also as explained, inputted address information is matched with all address information in the valid storage units of the second memory 30 in parallel, and operand(s) corresponding to successfully-matched address information may then be outputted to the processor core 101 as the operand(s).

Figure 4A:
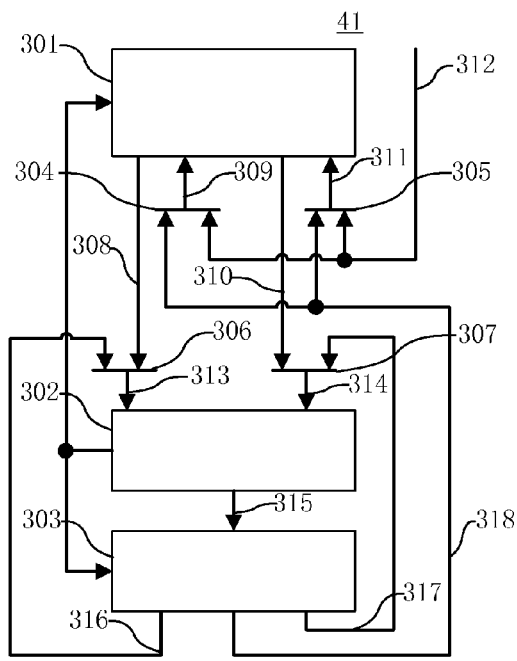
FIG. 4A illustrates another exemplary processor-cache structure consistent with the disclosed embodiments.

FIG. 4A illustrates another exemplary processor-cache structure 41 consistent with the disclosed embodiments. As shown in FIG. 4A, processor-cache structure 41 includes a processor core 302, a first memory 301, and a second memory 303. Processor core 302 is coupled to both the first memory 301 and the second memory 303 for obtaining operands for execution. The first memory 301 and the second memory 303 are considered as the L0 memory. Although the first memory 301 and second memory 303, as shown, only include a single memory module, a plurality of memory devices or modules may be included in the first memory 301 and/or second memory 303, and data may be read from or written to one or more memory modules in first memory 301 and/or second memory 303.

During operation, processor core 302 may obtain one, two, or more operands from the L0 memory (i.e., first memory 301 and second memory 303) and store results of operations in the L0 memory. For example, processor core 302 may obtain two operands 313 and 314 from the L0 memory, and stores result 315 into the L0 memory. More particularly, operand 313 is selected by multiplexer 306 as one of operand 308 from the first memory 301 and operand 316 from the second memory 303; and operand 314 is selected by multiplexer 307 as one of operand 310 from the first memory 301 and operand 317 from the second memory 303. Result 315 is written into the second memory 303. Further, data 318 in second memory 303 may be stored back into the first memory 301 through two write ports 309 and 311 of the first memory 301. The two write ports 309 and 311 of the first memory 301 may also be accessed by refill path 312, as selected by multiplexers 304 and 305, respectively.

First memory 301 may support providing and/or receiving two data items at the same time. First memory 301 may thus include a 4-port memory, which has two output data buses 308 and 310 and two input data buses 309 and 311, and supports simultaneous of two sets of output data, two sets of input data, or one set of input data and one set of output data. The first memory 301 may also include a 2-port memory, which has two input/output data buses, to support simultaneous of two sets of output data, two sets of input data, or one set of input data and one set of output data.

The second memory 303 may support providing three output data 316, 317, and 318 and receiving an input data 315, and thus may include a 4-port memory. The first memory 301 and the second memory 303 are addressed by data addresses generated by processor core 302. For example, the first memory 301 may be addressed using various index addressing methods, such as addressing based on actual address value, a base address value and an offset value; or a base pointer register number and an offset value. The second memory 303 may be addressed by matching addressing information, in addition to or instead of the various index addressing methods. For ease of description, the first memory 301 is assumed as a 4-port memory, though a 2-port or other memory achieves similar results.

Because the second memory 303 stores result 315 from processor core 302, and also assuming that result 315 may be likely used in later operations, processor core 302 may initially obtain operands only from the first memory 301. Processor core 302 then writes result 315 to the second memory 303. As results of previous operations may normally be used as operands of subsequent operations, after some operations, processor core 302 may obtain some or all operands from the second memory 303 and store results of the operations into the second memory 303. Further, when the processor core 302 or the execution unit of processor core 302 reads operands from the second memory 303, the first memory 301 may obtain new data from external memory (such as the L1 cache), or from the second memory 303. Thus, data in the L0 memory may be directly used by the execution unit of the processor core 302 without going through the register file, i.e., operands are accessed from L0 memory directly by the execution unit without using any special 'load' (to register) or 'store' (from register) instructions.

Figure 4B:
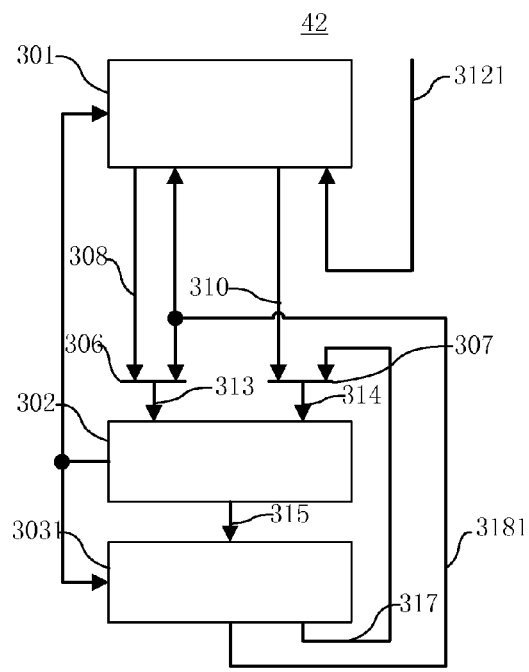
FIG. 4B illustrates another exemplary processor-cache structure consistent with the disclosed embodiments.

FIG. 4B illustrates another exemplary processor-cache structure 42 consistent with the disclosed embodiments. The processor-cache structure 42 is similar to processor-cache structure 41 in FIG. 4A. However, as shown in FIG. 4B, processor-cache structure 42 includes a 3-port second memory 3031, which provides two output data 317 and 3181 and one input data 315. Further, in processor-cache structure 42, the refill path 3121 from the external memory does not share any write port of first memory 301 with output data 3181 from the second memory 3031. Both refill path 3121 and output data 3181 are coupled directly to respective write ports of the first memory 301. In addition, the output data 3181 of second memory 3031 is also provided to processor core 302 via multiplexer 306.

In operation, processor core 302 may initially obtain operands only from the first memory 301. Processor core 302 then writes result 315 to the second memory 3031. As previous operation results may normally be used as operands for subsequent operations, after some number of operations, processor core 302 may obtain some or all operands from the second memory 3031 and store results of the operations into the second memory 3031. Further, when the processor core 302 or the execution unit of processor core 302 reads operands 313 from output 3181 of the second memory 3031, output 3181 may also be written to the first memory 301 simultaneously. When the processor core 302 reads operands 314 from output 317 of the second memory 3031, data in external memory may be filled into the first memory 301 via refill path 3121. Thus, data in the L0 memory may directly provide operands to the execution unit of the processor core 302 and store operation results without going through the register file.

Figure 4C:
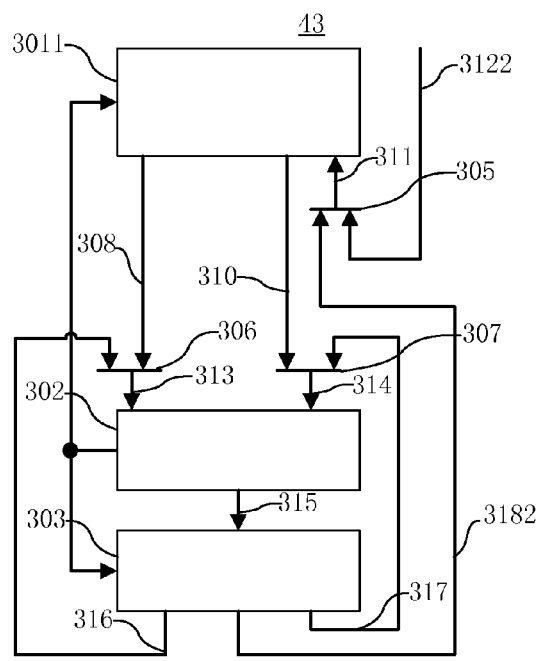
FIG. 4C illustrates another exemplary processor-cache structure consistent with the disclosed embodiments.

FIG. 4C illustrates another exemplary processor-cache structure 43 consistent with the disclosed embodiments. The processor-cache structure 43 is similar to processor-cache structure 41 in FIG. 4A. However, as shown in FIG. 4C, processor-cache structure 43 includes a first memory 3011, which supports providing two operands 308 and 310, or providing one operand 308 and receiving one input data 311. Further, data from refill path 3122 from the external memory and data from output 3182 from the second memory 303 are only sent to the first memory 3011 through multiplexer 305. Although having less ways to write data back to the first memory 3011 from both the external memory and the second memory 303, first memory 3011 may have a simple structure. Thus, data in the L0 memory may be directly provided as operands to the execution unit of the processor core 302 and operation results may be directly stored in the L0 memory without going through the register file.

Figure 4D:
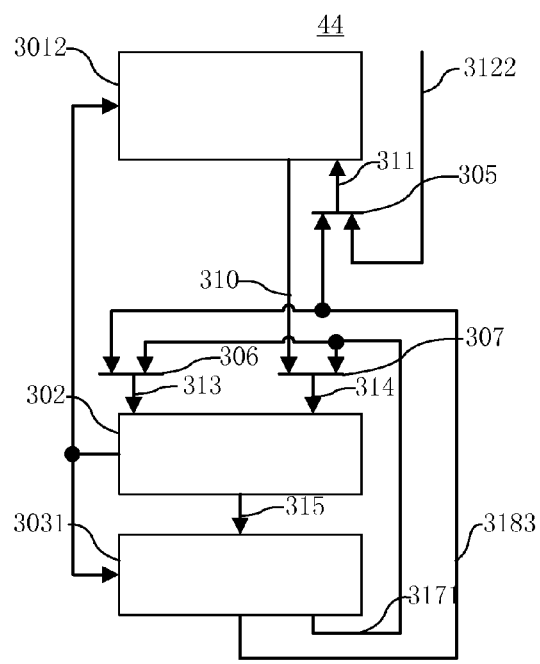
FIG. 4D illustrates another exemplary processor-cache structure consistent with the disclosed embodiments.

FIG. 4D illustrates another exemplary processor-cache structure 44 consistent with the disclosed embodiments. The processor-cache structure 44 is similar to processor-cache structure 42 in FIG. 4B. However, as shown in FIG. 4D, processor-cache structure 44 includes a first memory 3012, which supports providing one operand 310, or receiving input data 311. The input data 311 may be from refill path 3122 of the external memory or from output data 3183 from the second memory 3031 via multiplexer 305. Further, either output data 3183 or output data 3171 from the second memory 3031 may be provided as operand 313 via multiplexer 306, while output data 310 from the first memory 3012 or output data 3171 may be provided as operand 314 via multiplexer 307.

The instruction set supported by the processor core 302 may include certain single-operand instructions, i.e., certain instructions in which only one operand is from memory, and/or certain instructions in which an immediate from decoding op-code is used as an operand. Thus, not every instruction needs to obtain two operands from memory. For example, during operation, the processor core 302 may execute certain instructions that need only one operand from memory, and may initially obtain the one operand from the first memory 3012. The processor core 302 may write the result 315 of the execution to the second memory 3031. Alternatively, processor core 302 may execute a 'move' instruction to move operand data in the first memory 3012 to the second memory 3031, and then may obtain part or all operands from the second memory 3031. In addition, after certain number of operations, processor core 302 may obtain part or all operands from the second memory 3031.

Because the first memory 3012 does not support simultaneous read and write, when the processor core 302 is not obtaining operands from the first memory 3012, data 311 can be written into the first memory 3012 from the external memory through input data 3122 or from the second memory 3031 through output data 3183, as selected by multiplexer 305. Thus, processor-cache structure 44 may achieve that the L0 memory may directly provide operands to the execution unit of the processor core 302 and store operation results without going through the register file.

Figure 4E:
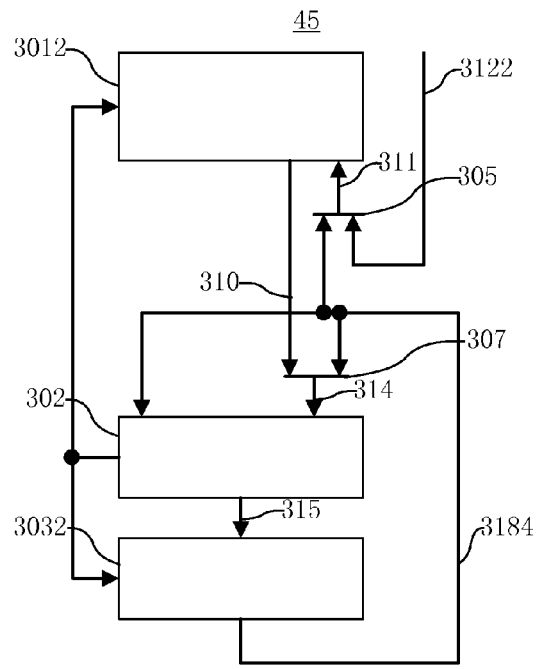
FIG. 4E illustrates another exemplary processor-cache structure consistent with the disclosed embodiments.

FIG. 4E illustrates another exemplary processor-cache structure 45 consistent with the disclosed embodiments. The processor-cache structure 45 is similar to processor-cache structure 44 in FIG. 4D. However, as shown in FIG. 4E, processor-cache structure 45 includes a 2-port second memory 3032, which supports providing only one output data 3184 and receiving one input data (result 315).

Further, output data 3184 of the second memory 3032 may be provided to processor core 302 as one operand, and may also be provided to processor core 302 as a second operand 314, along with output data 310 of the first memory 3012, as selected by multiplexer 307. Further, output data 3184 or refill data path 3122 may be written to the first memory 3012 as input data 311 selected by multiplexer 305.

Because the second memory 3032 cannot simultaneously provide two operands to processor core 302, processor core 302 may need to obtain operands from both the first memory 3012 and the second memory 3032 when executing instructions requiring two or more operands. Although such operation may reduce chances for the second memory 3032 to write data back to the first memory 3012, design complexity may be significantly reduced and such structure may be desired when single-operand instructions appear frequently.

Figure 4F:
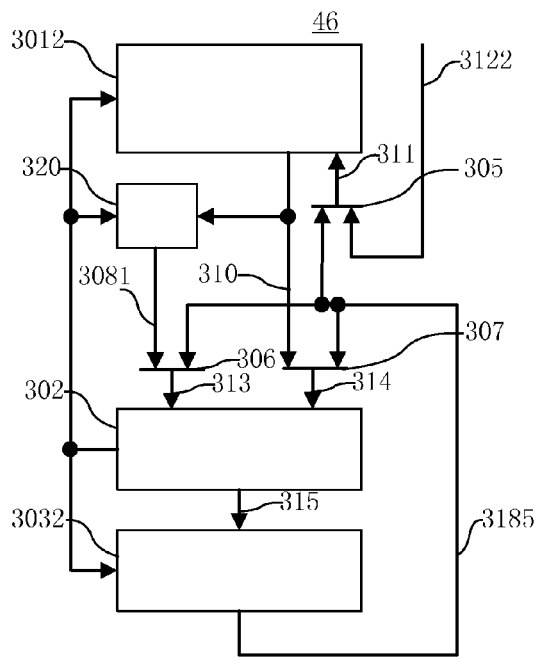
FIG. 4F illustrates another exemplary processor-cache structure consistent with the disclosed embodiments.

FIG. 4F illustrates another exemplary processor-cache structure 46 consistent with the disclosed embodiments. The processor-cache structure 46 is similar to processor-cache structure 45 in FIG. 4E. However, as shown in FIG. 4F, processor-cache structure 46 further includes a third memory 320, which may be functionally similar to a look-aside-buffer. Third memory 320 may also include address information matching functionality.

During operation, processor core 302 may perform an operand address matching first in third memory 320 before reading from the first memory 3012. When there is a matched address in third memory 320, data corresponding to the matched address is inputted to the processor core 302 as one operand 313. When there is no matched address in third memory 320, processor core 302 may then read the operand from first memory 3012.

Further, address information for addressing third memory 320 may also be generated by processor core 302. Third memory 320 may also receive output data 310 from the first memory 3012 and provide output 3081 as one operand 313 via multiplexer 306. When processor core 302 needs to read two operands from the first memory 3012, one of the two operands may be first read from the first memory 3012 and temporarily stored in the third buffer memory 320, such that both operands may be read from first memory 3012 and the third memory 320 in the next clock cycle. This situation is similar to the processor pipeline stalling for a cycle. Moreover, output data 3185 from the second memory 3032 may be provided as operand 313 and operand 314 via multiplexers 306 and 307, respectively, and may be further provided to the first memory 3012 via multiplexer 305 as possible input data 311.

Thus, the third memory 320 may temporarily store output data 310 from the first memory 3012. Later, when an instruction requires a same operand from the first memory 3012, the operand can be outputted from the third memory 320. Thus, the first memory 3012 may have more time to receive output data 3185 from the second memory 3032 to accommodate a large range of programs.

Figure 4G:
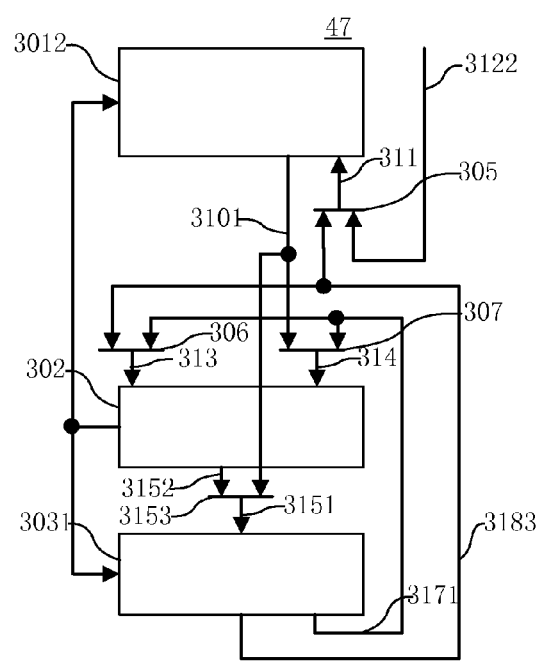
FIG. 4G illustrates another exemplary processor-cache structure consistent with the disclosed embodiments.

FIG. 4G illustrates another exemplary processor-cache structure 47 consistent with the disclosed embodiments. The processor-cache structure 47 is similar to processor-cache structure 44 in FIG. 4D. However, as shown in FIG. 4G, output data 3101 from first memory 3012 may be provided to processor core 302 via multiplexer 307, as well as to the second memory 3031 via multiplexer 3153. Multiplexer 3153 may also select result 3152 from processor core 302 and output data 3101 as input data 3151 to the second memory 3031.

Thus, by using a direct path between the first memory 3012 and the second memory 3031, data may be moved from the first memory 3012 to the second memory 3031 bypassing the processor core 302 to free up the processor core 302 from, for example, any 'move' operations. Further, the input port 3151 may support a 'write through' operation such that input data on 3151 can be outputted on 3171 or 3183 as an operand to processor core 302 within the same cycle. In addition, processor-cache structure 47 does not need to use a third memory, which may be considered as being integrated into the second memory 3031 to simplify design and save space.

Figure 4H:
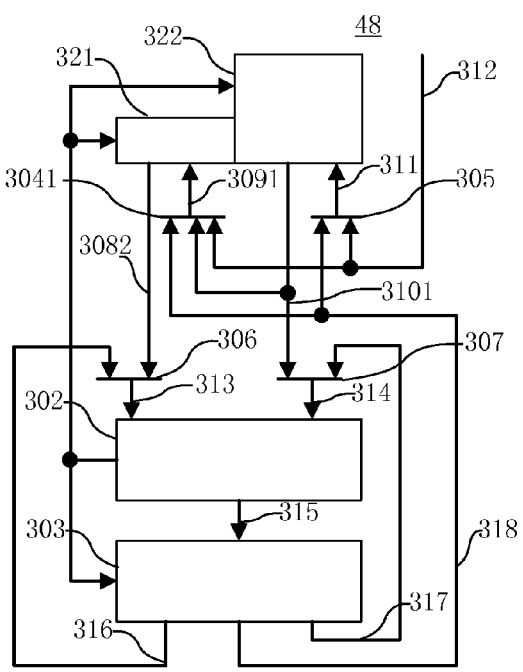
FIG. 4H illustrates another exemplary processor-cache structure consistent with the disclosed embodiments.

FIG. 4H illustrates another exemplary processor-cache structure 48 consistent with the disclosed embodiments. The processor-cache structure 48 is similar to processor-cache structure 41 in FIG. 4A. However, as shown in FIG. 4H, the first memory includes a memory 321 and a memory 322. Memory 321 and memory 322 may be of different sizes. For example, memory 322 may have a larger size than memory 321.

Further, each of memory 321 and memory 322 may only support providing one data output or receiving one data input. For example, memory 321 may provide output data 3082 as operand 313 via multiplexer 306, and may receive input data 3091 via multiplexer 3041. Memory 322 may provide output data 3101 as operand 314 via multiplexer 307, and may receive input data 311 via multiplexer 305. Further, input data 3091 to memory 321 may be selected from the input data 312 from an external memory, the output data 318 from the second memory 303, and output data 3101 from memory 322.

In operation, memory 322, with a large size, may be used to store all data that is stored in first memory 301 in FIG. 4A. Memory 321 may store frequently used data from the memory 322 such that processor core 302 may obtain any operands from both memory 321 and memory 322. That is, memory 321 stores a part of contents of memory 322. Further, the frequently used data or operands may be from a data segment pointed by a current base pointer (BP) register. Thus, to write data to the first memory, the data need to be written to the memory 321 and memory 322 separately at corresponding addresses for memory 321 and memory 322, respectively. To read data from the first memory, same or different data may be read out from memory 321 and memory 322 at the same time. Further, second memory 303 may also include two or more memory devices. In addition, memory 321 may store a subset of data of memory 322 based on a predetermined algorithm.

Figure 4I:
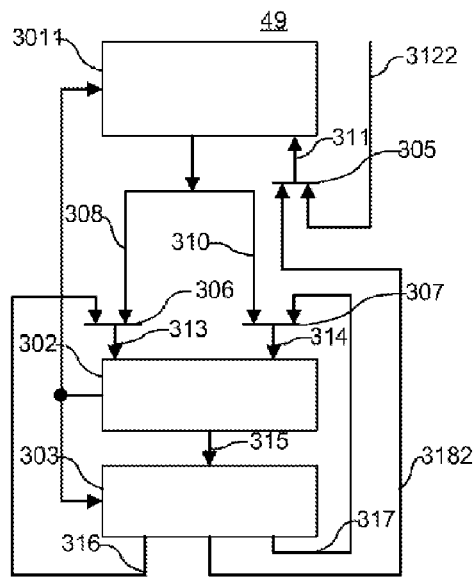
FIG. 4I illustrates another exemplary processor-cache structure consistent with the disclosed embodiments.

FIG. 4I illustrates another exemplary processor-cache structure 49 consistent with the disclosed embodiments. The processor-cache structure 49 is similar to processor-cache structure 43 in FIG. 4C. However, as shown in FIG. 4I, output 308 and output 310 are from a single read port. Thus, within a single cycle, first memory 3011 may provide an operand on either output 308 or output 310, while the second memory 303 provides another operand from either output 316 or output 317. Thus, different combinations for providing operands between the first memory 3011 and the second memory 303 may be implemented.

For example, the first memory 3011 may provide a first operand on output 308 and the second memory 303 may provide a second operand on output 317, or the second memory 303 may provide a first operand on output 316 and the first memory 3011 may provide a second operand on output 310. Therefore, the order of operands may be switched depending on which memory provides which operands on which output ports.

Although various structures and configurations are described above, other structures and configurations may also be included. Further, the various structures and configurations may also be mixed or reconfigured.

Figure 5A:
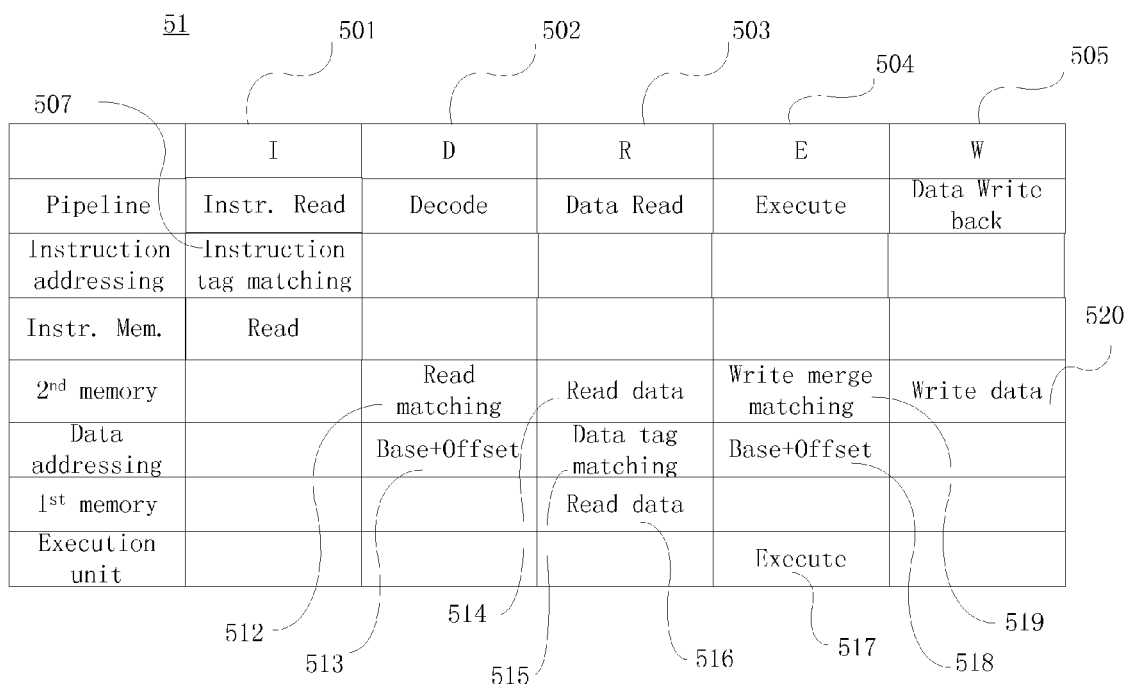
FIG. 5A illustrates an exemplary pipeline structure consistent with the disclosed embodiments.

Further, processor core 302 may also support pipeline operations. Because processor core 302 may access the L0 memory instead of the register file when obtaining operands or writing back results, certain pipeline operations may be configured accordingly. FIG. 5A illustrates an exemplary pipeline structure 51 consistent with the disclosed embodiments.

As shown in FIG. 5A, a 5-stage pipeline includes instructions read 501 (I), instruction decode 502 (D), data read 503 (R), execution 504 (E), and data write-back 505 (W). Other pipeline stages or structures may also be used. As explained above, the L0 memory includes a first memory and a second memory, and the first memory may use memory supporting tag matching structures.

During the instruction read stage 501, an instruction(s) is read from the instruction memory or instruction cache (e.g., the L1 cache). In this stage, instruction tag matching may be performed (507), and a matched instruction is read out from the instruction memory or instruction cache. In the instruction decoding stage 502, the instruction is decoded, and address information about operands is obtained and matched with contents in the second memory (512), and a complete data address is also obtained by adding the base address and the offset address in the address information (513).

Further, during the data read stage 503, one or more operands may be required by the instruction. If the address matching during the instruction decoding stage 502 is successful, data (operands) can be directly read from the second memory (514). If the address matching is unsuccessful, the complete data address obtained in the instruction decoding stage 502 is used to perform a data tag matching (515), and the first memory is addressed based on the index addressing to read the required data (516), and then the proper data is obtained based on the tag matching result. During this stage, reading data from the second memory (514), data tag matching (515), and reading data from the first memory (516) may be performed at the same time to improve performance.

During the execution stage 504, the execution unit executes the operation (517), and operands may be the data read out from the L0 memory (the first memory and the second memory) or one or more immediate from instruction decoding. In addition, the second memory performs an address matching or write merge matching for the execution result to be written back (519), and a complete data address is calculated by adding the base address and the offset address in the address information (518). The write merge matching may refer to an address matching for performing the write merge functionality.

During the write-back stage 505, the execution result is written to the second memory (520). Thereafter, when the first memory is free to receive data sent by the second memory, the second memory writes back the stored data (e.g., execution results) to the first memory after data tag matching.

Because the L0 memory structure can support simultaneous read and write operations, and each instruction may read data from L0 memory as operands and write the result back to the L0 memory. Thus, data memory access may be performed in multiple stages in the series of pipeline stages corresponding to an instruction. Further, because the disclosed processor-cache structures do not include a register file, operands are read from the L0 memory and the result is written back to the L0 memory when an instruction is executed in the pipeline stages, instead of loading operands from memory into the register file or storing data from the register file to the memory, and reading the operands from the register file and writing the result to the register file.

Other pipeline configurations may also be used. For example, instruction tag matching in the instruction read stage 501 may be performed ahead of the instruction read stage 501, data tag matching in data read stage 503 may be performed ahead of the data read stage 503, thus the instruction read stage 501 and the data read stage 503 may have sufficient time to access the first memory. Further, when the executing instruction does not include any base pointer register number, and the first memory has sufficient capacity to accommodate all data required, the data tag matching may be skipped.

Figure 5B:
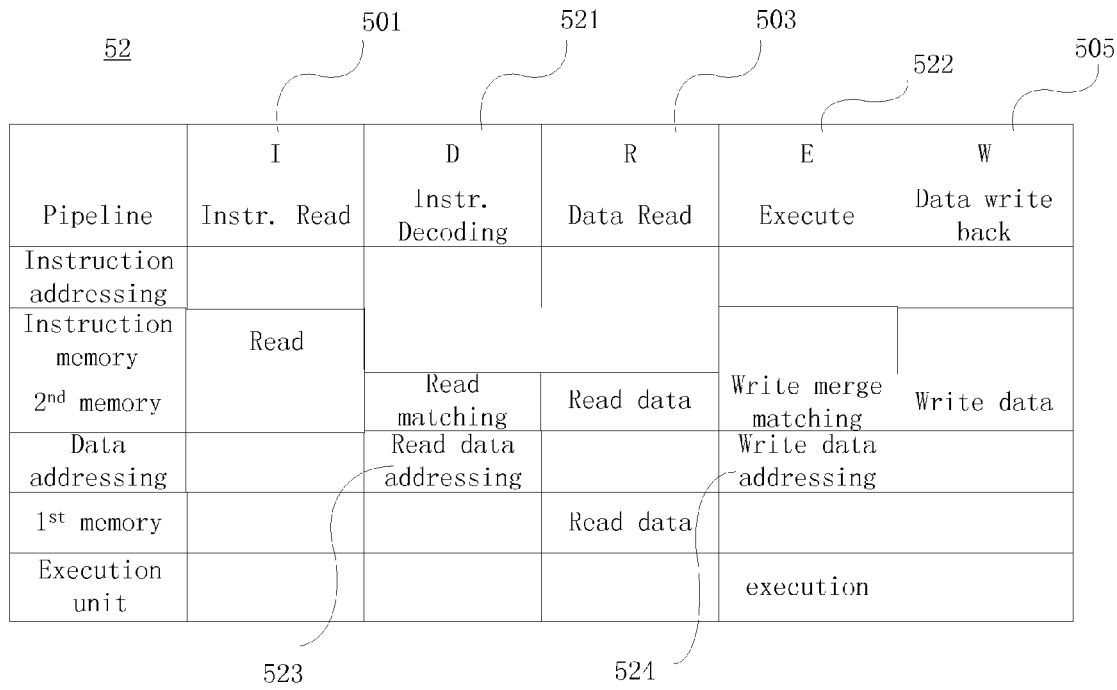
FIG. 5B illustrates another exemplary pipeline structure consistent with the disclosed embodiments.

FIG. 5B illustrates another exemplary pipeline structure 52 consistent with the disclosed embodiments. As shown in FIG. 5B, pipeline structure 52 also includes a 5-stage pipeline: instructions read 501 (I), instruction decoding 521 (D), data read 503 (R), execution 522 (E), and data write-back 505 (W). In the instruction read stage 501, instructions are read from the instruction memory or instruction cache (e.g., the L1 cache).

During the instruction decoding stage 521, address information about operands is matched with contents in the second memory, and, at the same time, the first memory is addressed using address information including the base address and the offset address (523). Further, during the data read stage 503, if the address matching during the instruction decoding stage 521 is successful, data (operands) can be directly read from the second memory; if the address matching is unsuccessful, data is read from the first memory.

Further, during the execution stage 522, the execution unit executes the operation. In addition, the second memory performs an address matching or write merge matching for the result to be written back, and, at the same time, the first memory is addressed using the base address and the offset address in the address information for writing the data (524).

During the write-back stage 505, the execution results are written to the second memory. Thereafter, when the first memory is free to receive data sent by the second memory, the second memory writes back the stored data to the first memory using the base address and the offset address. Descriptions of similar pipeline stages to those in FIG. 5A are omitted.

Other pipeline configurations may also be used. Thus, both pipeline structure 51 and pipeline structure 52 support operations without using a register file to obtain operands or using special 'load' or 'store' instructions to move data between memory and the register file. Further, differences between pipeline structure 51 and pipeline structure 52 may include that the first memory in pipeline structure 52 supports direct addressing using the base address and the offset address without the need to calculate a complete address for addressing purpose.

Further, if the L0 memory cannot be written into while providing operands, execution results may be written to the second memory in the data write-back stage. Thereafter, when the first memory is free to receive data sent by the second memory, the second memory writes back the stored data to the first memory.

Furthermore, although FIGS. 5A and 5B illustrate 5-stage pipeline structures, any appropriate number of pipeline stages may be used. For example, a 4-stage pipeline structure may be used by combining the instruction decoding stage and the data read stage into a single instruction decoding and data read pipeline stage. During the instruction decoding and data read pipeline stage, the instruction read from the instruction memory or instruction cache is decoded, address information of one or more operands used in the instruction is obtained, and the one or more operands are read out from the L0 memory directly using the obtained address information. In certain other embodiments, extra pipeline stages may be added to the pipeline structures previously described without departing from the principles of this disclosure.

In addition, certain instructions may be designed to be used with the various described processor-cache structures. The execution unit or the processor core may be configured to support such instructions. The instructions may include those supporting single data addressing, double data addressing, or three or more data addressing. Data addressing, as used herein, may include both operand addressing and execution result addressing. The data addressing may be performed by any appropriate addressing methods. For example, the addressing methods may include the immediate direct addressing, the base address and an immediate addressing, base pointer register and offset addressing, or offset only addressing, etc.

Figure 6A:
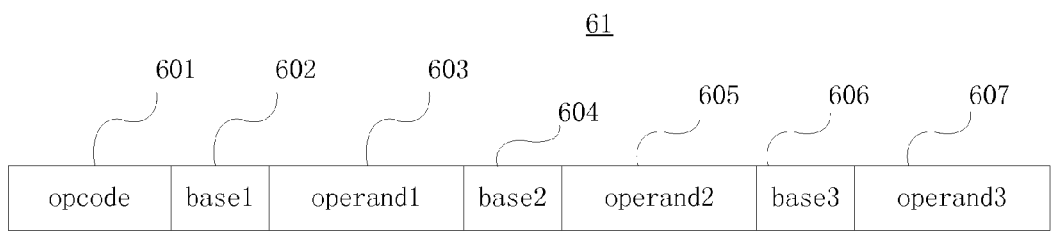
FIG. 6A illustrates an exemplary instruction format consistent with the disclosed embodiments.

FIG. 6A illustrates an exemplary instruction format 61 consistent with the disclosed embodiments. As shown in FIG. 6A, instruction 61 includes an op-code field 601 ('opcode'), a first base address or a first base pointer register number field 602 ('base1'), a first offset field 603 ('operand1'), a second base address or a second base pointer register number field 604 ('base2'), a second offset address field 605 ('operand2'), a third base address or a third base pointer register number field 606 ('base3'), and a third offset address field 607 ('operand3'). The third base address field may also be considered as a result base address field for a result of executing the instruction, and the third offset address field may also be considered as a result offset filed. Although, as shown, instruction 61 supports three operands (e.g., two input operands and one output operand), other formats may also be used. For example, a two-operand instruction may be introduced at a similar format but with a less pair of base pointer register and offset address fields.

More particularly, the base address in a base pointer register corresponding to the first base pointer register number 602 plus the first offset address 603 is the address for the first operand. Similarly, the base address in a base pointer register corresponding to the second base pointer register number 604 plus the second offset address 605 is the address for the second operand. The base address in a base pointer register corresponding to the third base pointer register number 606 plus the third offset address 607 is the address for the operation result or the third operand.

Figure 6B:
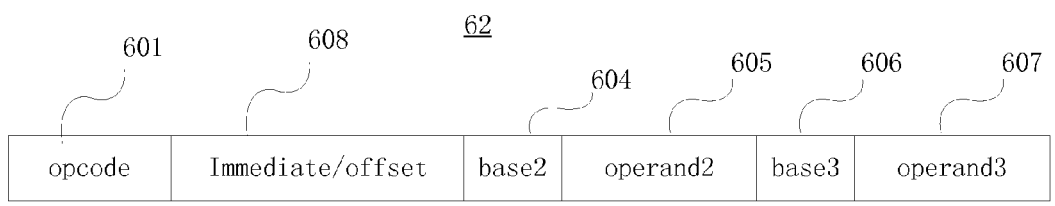
FIG. 6B illustrates another exemplary instruction format consistent with the disclosed embodiments.

FIG. 6B illustrates an exemplary instruction format 62 consistent with the disclosed embodiments. As shown in FIG. 6B, instruction 62 may be an immediate instruction or conditional branch instruction. Instruction 62 includes an op-code field 601 ('opcode'), an immediate/offset field 608 ('immediate/offset'), a second base pointer register number field 604 ('base2'), a second offset address field 605 ('operand2'), a third base pointer register number field 606 ('base3'), and a third offset address field 607 ('operand3').

When configured as an immediate instruction, because the immediate 608 is one operand, instruction 62 may only require reading a second operand from the L0 memory. Similar to instruction 61, the base address in a base pointer register corresponding to the second base pointer register number 604 plus the second offset address 605 is the address for the second operand. The base address in a base pointer register corresponding to the third base pointer register number 606 plus the third offset address 607 is the address for the operation result or the third operand.

When configured as a conditional branch instruction, because no result needs to be written back, instruction 62 may support reading two operands from the memory, the base address in a base pointer register corresponding to the second base pointer register number 604 plus the second offset address 605 is the address for the first operand, and the base address in a base pointer register corresponding to the third base pointer register number 606 plus the third offset address 607 is the address for the second operand. Further, the offset 608 provides the branch vector or branch offset.

A separate unconditional branch instruction may also be provided, or the unconditional branch instruction may be treated as a special case of this conditional branch instruction, i.e., a conditional branch instruction with the condition always being satisfied. For example, the second base pointer register number 604 and the third base pointer register number 606 may be set to a same value, and the second offset address 605 and the third offset address 607 may also be set to a same value such that a branch condition is always satisfied.

Further, base pointer registers contain base address of the data, and instructions for writing the base address may write the base address addressed by a base pointer register number and an offset address to the target base pointer register corresponding to the target base pointer register number. In addition, certain instructions may be configured to write two base addresses into two target base pointer registers, i.e., that instruction format includes four base pointer register numbers and two offsets. Address data addressed by two sets of a base pointer register number and an offset address are written into two target base pointer registers corresponding to two base pointer register numbers, respectively. For example, the two register numbers may take the field of the immediate/offset 608.

In addition, the above-described instructions may omit the base pointer register number, and instead may use a default base address. For example, the second base pointer register number 604 and the second offset 605 may be used together to indicate a large offset, while the corresponding base address is a default value, without being explicitly indicated in the instruction. Other configurations and instruction formats may also be used.

Base pointer (BP) registers may be used to address the L0 memory using a base address plus offset addressing mode. Each valid base pointer register may contain a base address of certain data stored in the L0 memory. A BP register number may be used in instructions to indicate which BP register to use. The base address in the BP register is then used, together with an offset, to address a proper memory. If the address information stored in the second memory of the L0 memory is in the format of a BP register number and an offset, and the content of the BP register corresponding to the BP register number changes, the address information in the second memory should be invalidated. If data stored in the second memory corresponding to the BP register number should but have not been written back to the first memory, the data should be written back to the first memory before being invalidated.

The BP registers may be written through a dedicated base address load instruction, or automatically updated with a new base address using the current base address of the BP register, plus a certain offset to obtain a new base address. Further, a plurality of BP registers may provide non-continuous address space to the execution unit, with shorter instruction fields to access dispersed data.

Further, different operands and result in an instruction may share a same set of BP registers, or may have their own independent or partially independent BP registers. A BP register may include a set of address registers used for addressing the first operand, the second operand, and the result. Or the BP register may include 3 sets of address registers, and individual sets of address registers are used for addressing the first operand, the second operand, and the result.

The BP registers may be used to hold base addresses. One or more BP registers may also be used to indicate reserved or un-writable address spaces. For example, if a BP register corresponding to an operation result indicates an un-writable address, the operation result will not be written to the L0 memory and will be discarded.

In addition, the second memory may be used as a temporary space for execution results, and the contents of the temporary space are not written back to the first memory, but may be provided as operands for later operations. Certain BP registers may be used to indicate corresponding temporary spaces. Further, such temporary space structure may also be used to replace certain operation/branch/status registers providing temporary storage of execution results, because the contents for these operation/branch/status registers are only used to provide operands for subsequent instructions to perform calculations, branch decision, and read/write status, etc.

Certain instructions may be designed to exploit intermediate operands (results) that do not require to be written back to the first memory. For example, an instruction may include a bit indicating whether the result of the instruction needs to be written into the first memory, and every operation result stored in the second memory corresponds to a written-back bit. If the bit in the instruction indicates that the result should be written back to the first memory, when the result is written or merged into the second memory, the written-back bit is set to 'true'. On the other hand, if the bit in the instruction indicates that the result should not be written back to the first memory, when the result is written or merged into the second memory, the written-back bit is set to or kept as 'false'. Or if the write address matches one entry of the address information stored in the second memory and the corresponding written-bit is 'true', the data in second memory corresponding to the matched entry is first stored to the first memory from the second memory, then the incoming result is written into the matched entry in the second memory. Thus, when the data in the second memory are written back to the first memory, only the results marked with 'true' written-back bit are written back to the first memory.

Besides the BP registers, a BP mode register may also be provided to facilitate multi-thread programming. The BP mode register may be used as a thread register to indicate a thread number of a thread currently running. The BP registers may be divided into multiple groups for different threads to use, and different values in the BP mode register may correspond to different groups. Further, each mode in the BP mode register may correspond to a thread, and the corresponding content of the BP mode register is the thread number (PID). Further, the number of the BP registers may be related to the number of modes or the width of the BP mode register. For example, if the width of the BP mode register is n, the number of BP registers may be 2n. Other relationships may also be used.

Further, to support multi-thread programming, a plurality of processor state register groups may be provided to store a current processor state of a current thread and to restore the processor state of a new thread. The total number of the plurality of processor state register groups may equal to the maximum number of threads supported. A different value of the BP mode register may correspond to a different processor state register group. Thus, thread switching, storing current processor state, and restoring the new processor state may be performed simultaneously to achieve fast thread switching. Further, the BP mode register may be accessed using certain BP mode register instructions. These instructions may include a dedicated base pointer mode load instruction or a BP register load instruction with a different target register number.

Figure 7:
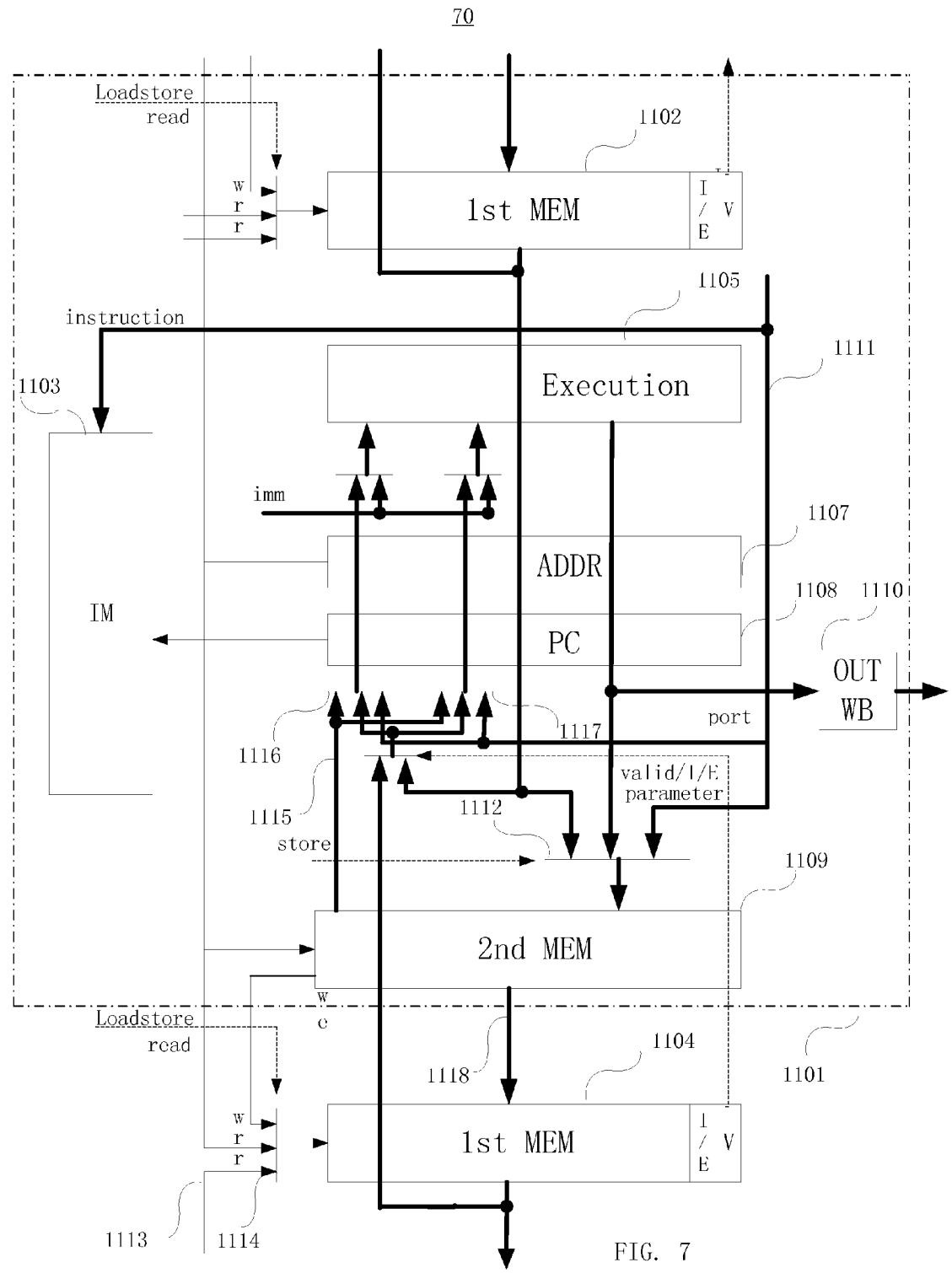
FIG. 7 illustrates an exemplary multi-core processor-cache structure consistent with the disclosed embodiments.

Although the above embodiments may be described with respect to one processor core, any number of processor cores may be used. FIG. 7 illustrates an exemplary multi-core processor-cache structure 70 consistent with disclosed embodiments. As shown in FIG. 7, first processor core 1101 may include a local instruction memory 1103, an execution unit 1105, a data address generation module 1107, a program counter (PC) 1108, an output buffer 1110, and a L0 memory. The L0 memory may include a first memory 1102 and a second memory 1109. Further, a second processor core (not shown) may be coupled to the first processor core 1101 in a serially connected configuration, and first memory 1104 is from the second processor core (as part of the L0 memory of the second processor core), but may also be coupled to the first processor core 1101.

Local instruction memory 1103 stores instructions for the first processor core 1101 to execute. Execution unit 1105 of the first processor core 1101 may obtain operands from the first memory 1102, the second memory 1109, and the first memory 1104, or from an immediate from instructions. The result of the execution is written back to the second memory 1109.

Further, data from the first memory 1102, data 1115 from the second memory 1109, data from the first memory 1104 of the second processor core, and data 1111 from an external shared memory (not shown) may provide operands to the execution unit 1105 via multiplexers 1116 and 1117.

The second memory 1109 may receive data from three sources: results from the execution unit 1105, data from the first memory 1102, and data 1111 from the external shared memory. Further, results from the execution unit 1105, data from the first memory 1102, and data 1111 from the external shared memory may be selected by the multiplexer 1112 to input to the second memory 1109.

Further, a first memory (e.g., first memory 1102, first memory 1104) may receive data from only a second memory of a previous processor core. For example, first memory 1104 only receives data from second memory 1109 of the first processor core 1101 via input 1118.

The first memory 1102 may also receive address information from three sources: addresses for writing stored in address storage entries of a second memory of a previous processor core (not shown) 'w', addresses for reading generated by an address generation module by the previous processor core 'r', and addresses for reading generated by address generation module 1107 of local processor core 1101 'r'. These addresses are selected by a multiplexer to input to the first memory 1102.

Accordingly, the first memory 1104 may also receive address information from three sources: addresses for writing stored in address storage entries of second memory 1109 of a previous processor core 1101 'w', addresses for reading generated by an address generation module 1107 of the previous processor core 1101 'r', and addresses for reading generated by an address generation module of local processor core 'r' 1113. These addresses are selected by a multiplexer 1114 to input to the first memory 1104.

Thus, during operation, the processor core prior to processor core 1101 may write execution results into the first memory 1102. The first memory 1102 may directly provide operands to the processor core 1101 or execution unit 1105, or may bypass the data into the second memory 1109. The execution results from the execution unit 1105 can be directly written to the second memory 1109. The second memory 1109 provides operand data 1115 addressed by addresses from address generation module 1107 as operands to the execution unit 1105. Further, because the above example illustrates a serially-connected multi-core structure, the second memory 1109 does not need to write data back to the first memory 1102 of the processor core 1101, and instead writes data back to the first memory 1104 of the second processor core as to achieve data transfer for subsequent operations.

In addition, because the processor cores in the serially-connected multi-core structure do not include traditional general registers (register files), execution results from each processor core can be passed directly in the L0 memory coupled between two processor cores, and the efficiency of the multi-core structure may be significantly increased.

The disclosed systems and methods may provide fundamental solutions to processor-cache structures. The disclosed systems and methods eliminate general register files and the special 'load' and 'store' instructions by introducing a level-zero memory for the processor, and thus significantly increases efficiency of the processor. Other advantages and applications are obvious to those skilled in the art.

INDUSTRIAL APPLICABILITY

The disclosed processor-cache structure may be used in various applications in memory devices, processors, processor subsystems, and other computing systems. For example, the disclosed processor-cache structure may be used to provide high code density processor applications, and high-efficient data processing applications crossing single core or multiple core processor systems.

SEQUENCE LIST TEXT

The invention claimed is:

1. A digital system, comprising:
an execution unit coupled to a data memory containing data to be used in operations of the execution unit;
a level-zero (L0) memory coupled between the execution unit and the data memory and configured to receive a part of the data in the data memory; and
an address generation unit configured to generate address information for addressing the L0 memory,
wherein the L0 memory provides at least two operands of a single instruction from the part of the data to the execution unit directly, without loading the at least two operands into one or more registers, using the address information from the address generation unit.

2. The system according to claim 1, wherein:
the L0 memory stores a result from the single instruction from the execution unit directly, without storing the result in a register, using the address information from the address generation unit.

3. The system according to claim 1, wherein:
the L0 memory includes a first memory and a second memory;
the first memory is coupled to the execution unit to provide one or more of the at least two operands; and
the second memory is coupled to the execution unit to receive the result and to provide one or more of the at least two operands.

4. The system according to claim 3, wherein:
the first memory is addressed by using at least one of an immediate direct addressing mode and a base address plus offset addressing mode.

5. The system according to claim 3, wherein:
the second memory is configured to store address information of the operands and corresponding operands, and the address information is content-addressable.

6. The system according to claim 5, wherein:
when the result corresponds to an address stored in the second memory, the stored operand corresponding to the address is updated to the result before being written back to the first memory.

7. The system according to claim 5, wherein:
the address information includes one of an actual address value, a base address value and an offset value, and a base pointer register number and an offset value.

8. The system according to claim 3, further including:
a third memory coupled to the execution unit and the first memory, wherein the execution unit is configured to obtain an operand from the third memory first and to obtain the operand from the first memory when the third memory does not contain the operand.

9. The system according to claim 3, wherein:
the first memory includes a first memory device with a first size and a second memory device with a second size, the first size being larger than the second size,
wherein the second memory device stores frequently-used data from the first memory device.

10. A multi-core processor comprising a plurality of serially-connected digital systems according to claim 3, wherein an operation result written to a second memory of one digital system is provided to a first memory of a subsequent digital system such that the operation result is used in a multi-core operation.

11. The system according to claim 3, wherein:
the second memory includes a temporary storage space for storing temporary operation results that are not required to be written back to the first memory but are capable of being operands to the execution unit.

12. The system according to claim 3, wherein:
the execution unit is configured to accept an instruction including a bit indicating whether the result of the instruction needs to be written back to the first memory.

13. The system according to claim 3, wherein:
the execution unit is configured to accept an instruction including an opcode field, a first base address field, a first offset field, a second base address field, a second offset field, a result base address field, and a result offset field.

* * * * *